Jan. 16, 1968  F. C. ARRANCE ET AL  3,364,077
BATTERY SEPARATOR AND BATTERY
Filed June 29, 1964
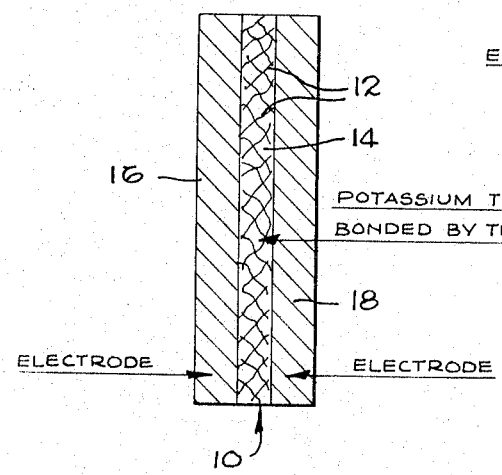
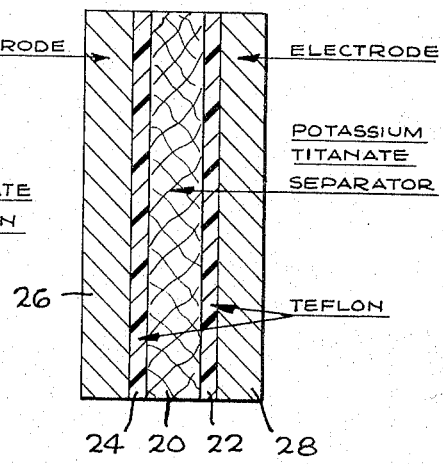
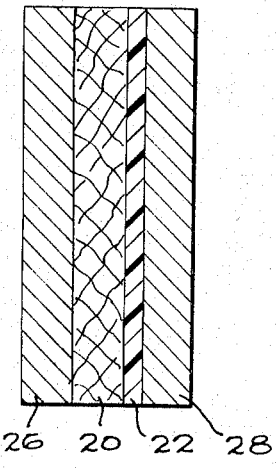
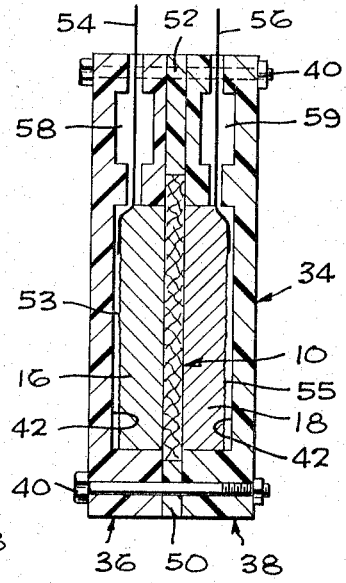
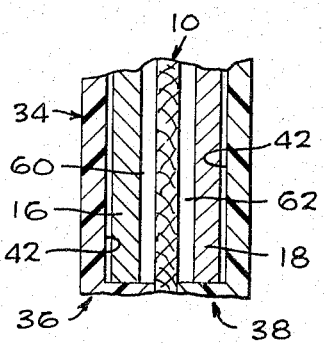
FRANK C. ARRANCE
WILLIAM H. GRAVES JR
INVENTORS
BY Max Geldin
ATTORNEY

United States Patent Office

3,364,077
Patented Jan. 16, 1968

3,364,077
BATTERY SEPARATOR AND BATTERY
Frank C. Arrance, Costa Mesa, Calif., and William H. Graves, Jr., Lewisburg, W. Va., assignors, by mesne assignments, to McDonnell Douglas Corporation, Santa Monica, Calif., a corporation of Maryland
Filed June 29, 1964, Ser. No. 378,898
9 Claims. (Cl. 136—146)

This invention relates to batteries, particularly high energy density batteries, and is especially concerned with provision of improved separators for use in such batteries, and to improved battery construction embodying efficient separators formed of certain inorganic materials having a porous internal structure, particularly in combination or bonded with certain organic materials which enhance the strength and flexibility of the inorganic separator.

Batteries are an important source of energy storage for power generation in air-borne systems. An important type of battery, particularly suited for such applications, are the high energy density alkaline electrolyte cells using such electrode combinations as silver-zinc, silver-cadmium and nickel-cadmium. High energy density batteries are generally battery systems which have a substantially higher energy per unit of weight than conventional, e.g. lead, storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In high energy density batteries such as silver-zinc, nickel-cadmium, silver-cadmium, the separator performs the function of retaining electrolyte, e.g. potassium hydroxide, separating the electrodes, and preventing migration of electrode ions or growth of dendritic crystals of electrode ions such as zinc ions, which short circuit the battery. It has been known to employ organic separators in such batteries but these have several disadvantages. Thus, such organic separators are not chemically stable especially at temperatures above 50° C., they tend to swell excessively at elevated temperatures and most organics are not readily wetted by caustic solutions. Further, organics are not inert to silver oxide in caustic solutions and organic materials are generally soft and pliable and are easily punctured by dendrite growth.

One object of this invention is to provide improved high energy density batteries having extended periods of life and which are capable of operation at high temperatures of the order of about 100° C. and above, as well as at ambient temperatures, and to provide improved battery separators especially designed for use in such batteries.

Another object of the invention is the development of battery separators comprising inorganic materials, and improved battery construction, particularly silver-zinc, silver-cadmium, nickel-cadmium, and other high energy density battery systems, for operation at ambient temperatures and at temperatures up to and above 100° C.

A particular object of the invention is to provide improved battery separators composed of inorganic material, for example of a type which when employed alone as a battery separator has properties, e.g., porosity, corrosion resistance, and high temperature stability, but has insufficient strength for satisfactory performance, and which is strengthened by combination therewith of certain organic materials, thus forming an efficient battery separator of good strength.

A still further object of the invention is to design a battery separator composed of a particular inorganic material which has been strengthened by combination with organic materials which do not adversely affect the characteristics of such inorganic material for use as a battery separator, yet which enhance the strength and improve other characteristics of the separator.

A still further object of the invention is the provision of an improved battery, particularly suited for air-borne applications, and incorporating a particular efficient inorganic separator embodying means for increasing the strength of such separator and enhancing its characteristics for use as a battery separator.

Other objects and advantages of the invention will appear hereinafter.

The invention hereof is based on the discovery that titanates, particularly potassium titanate, preferably in the form of fibers or mats, have excellent properties of chemical resistance, porosity, and high temperature stability required for use in battery separators, particularly for high temperature operation. However, such separators are relatively thin in cross section, and when potassium titanate alone is employed as a separator in a battery, it has insufficient strength for extended periods of operation, and the separator tends to deteriorate, e.g. to tear or pull, particularly due to gas activity, rupturing or breaking the separator in a relatively short period of operation and causing short circuiting and failure of the battery.

Thus, potassium titanate fibrous separators are satisfactory for use in primary batteries, i.e. batteries which are not intended to be recharged, and are also satisfactory for use in short lived secondary batteries for a limited number of charge-discharge cycles before battery failure occurs. But potassium titanate alone is not satisfactory for use in secondary batteries intended to operate efficiently over a large number of charge-discharge cycles, as is required in certain applications, such as air-borne operations.

It has now been found as a particular feature of the invention that inorganic materials which have good characteristics for use as battery separators but which have inferior strength, notably titanates such as the alkali metal titanates particularly potassium titanate, can be strengthened without adversely affecting its advantageous characteristics, by means of certain organic materials, particularly Teflon (tetrafluoroethylene polymer). Thus, for example, inorganic fibrous material, such as potassium titanate fibers or mats, can be mixed with the organic material such as Teflon, e.g., in powder form, and the mixture subjected to a bonding operation such as the application of pressure and elevated temperature, to provide a matrix of the inorganic material, e.g., potassium titanate fibers, bonded together by the organic bonding agent, e.g., Teflon. The proportions of the organic fibrous material, e.g., potassium titanate fiber, and of the bonding agent, e.g., Teflon, are chosen so that the resulting molded matrix has sufficient porosity to hold a suitable amount of electrolyte and for efficient use as a battery separator. Alternatively, sheets of certain organic materials, for example, microporous Teflon, can be pressed against one or against opposite surfaces of a thin membrane of an inorganic material such as potassium titanate and such assembly used as a separator between the battery electrodes.

The resulting separator formed by bonding the inorganic fibers, e.g., potassium titanate fibers, with Teflon, or by combining an inorganic membrane, particularly a potassium titanate membrane, with porous plastic sheets or papers, e.g., Teflon paper, combines the resistance to chemical attack of the inorganic material, e.g., potassium titanate, with the strength and flexibility of the organic material, e.g., Teflon, providing a separator of increased strength both in tension and compression. It is noteworthy that both potassium titanate and Teflon have excellent resistance also to high temperatures. Such reinforced separators have materially improved effectiveness for use in secondary batteries requiring efficient operation over a substantial number of discharge-charge cycles, especially at elevated temperatures of the order of about 100° C.

The invention will be described more fully below in connection with the accompanying drawing wherein:

FIG. 1 illustrates one embodiment of a battery separator according to the invention in relation to a pair of electrodes;

FIGS. 2 and 2a illustrate another embodiment of the invention;

FIG. 3 shows an assembled battery incorporating a separator embodying the principles of the invention; and FIG. 4 shows a modification of the electrode assembly of FIG. 3.

According to one embodiment of the instant improvement, the inorganic material, e.g., potassium titanate, in the form of fibers or mat is mixed with an organic bonding material such as Teflon, and the mixture is subjected to pressures which can range from a few hundred pounds to several tons and at temperatures ranging from ambient up to about 600° F. The resulting separator is in the form of a matrix composed of inorganic fiber or mat material bonded together by the organic material. A separator of this type can be positioned between electrodes in a battery as illustrated in FIG. 1 of the drawing. In FIG. 1, numeral 10 represents the separator thereof formed of a matrix composed of the inorganic potassium titanate material 12, bonded together by the Teflon bonding material 14. Numeral 16 represents an electrode, such as a zinc electrode, which is pressed against one side of the separator 10, and 18 represents a silver oxide electrode which is pressed against the other side of the separator.

Alternatively, the separator matrix can be composed chiefly of organic material such as Teflon having uniformly distributed therein the inorganic, e.g., potassium titanate fibers, depending upon the relative proportions of the inorganic fibrous material and organic bonding agent employed.

The separator according to the invention is composed of an inorganic fiber or mat material, e.g., potassium titanate in proportions to provide a porosity in the separator sufficient to allow the passage of alkali metal and hydroxyl ions, that is, electrolyte ions, yet retain the ions of the electrodes in their respective compartments and prevent introduction of such ions into and through the separator. Such porosity should range from about 8% to about 40% as measured by water absorption according to the expression:

$$\frac{\text{Weight after water saturation} - \text{dry weight}}{\text{dry weight}} \times 100$$

For this purpose the proportions of organic bonding agent, e.g., Teflon, which can be employed can range from about 2% to about 90%, preferably about 10% to 60%, by weight of the mixture of organic fibrous material, e.g., potassium titanate, and binder. A mixture found particularly suitable is composed of about 50% of inorganic fibers or mat material, and about 50% of organic binder, by weight.

In addition to the preferred potassium titanate, other fibrous inorganic materials which are improved and rendered highly suitable for use as battery separators by bonding with organic materials according to the invention are the aluminosilicates, including the alkali metal, e.g., sodium and potassium, and the alkaline earth, e.g., magnesium, calcium and barium aluminosilicates, zirconia, silica, alumina, and the like. These inorganic materials are significantly strengthened and flexibilized by bonding with suitable organic bonding agents as described in greater detail below.

For use of the separators in high energy density batteries the bonding agents employed to bond the inorganic fibers or mat should be resistant particularly to concentrated potassium hydroxide, used as electrolyte in such batteries, at temperatures of the order of 100° C. and above, and such bonding agents should of course be capable of bonding together inorganic fibers or mats of the type noted above, to enhance the strength and flexibility of such inorganic materials, as compared to the latter materials when pressed together to form a mat, but in the absence of such organic bonding agents. Further, such organic bonding agents should be such as to permit the fibrous inorganic material to retain its porosity to a large degree in the compressed matrix composed of the inorganic material bonded together by the organic bonding agent.

Bonding agents which can be employed according to the invention, are preferably thermoplastic resins of good heat stability and chemical resistance, particularly to alkali. For this purpose Teflon, due to its high temperature resistance, strength and chemical resistance, has been found eminently suited for use as a bonding agent, especially for the above inorganic fibrous materials, particularly the preferred potassium titanate, in production of battery separators according to the invention. Other preferred organic bonding agents or polymers include Kel-F (trifluorochloro-ethylene resin), nylon (polyamides), and Dynel (copolymer of vinyl chloride and acrylonitrile), in the order named. Additional organic bonding agents which may be employed to bond inorganic materials as above defined and form separators of some suitability in high energy density batteries, are Hycar (a butadiene-acrylonitrile rubber), acrylics, and polyethylene and polypropylene resins. The organic bonding agents set forth above are given mainly as examples, and other organic bonding agents also can be employed.

According to a modification of the improvement of the invention, as illustrated in FIGS. 2 and 2a, a fibrous inorganic material of the types described above, for example, a potassium titanate mat 20, can be strengthened to form a suitable battery separator by placing a sheet 22 of an organic material, preferably of the types described above, e.g., Teflon, in contact with a surface of the inorganic mat or fibrous material. While a single sheet of such paper, as illustrated at 22 in FIG. 2a will substantially improve the inorganic fibrous mat 20 for use as a battery separator, in preferred practice a second sheet or paper of such organic material, e.g., Teflon, is applied against the opposite surface of the inorganic membrane 20, as indicated at 24 in FIG. 2. Further, if desired a plurality of fibrous mats of inorganic material such as potassium titanate can be employed, each of the potassium titanate mat layers being "sandwiched" between or separated by an intermediate sheet or paper of organic material as described above. In the embodiment of FIG. 2 the electrodes, e.g., a zinc electrode 26, and a silver oxide electrode 28, are positioned in contact with the organic sheets or papers 22 and 24 forming, together with the inorganic, e.g., potassium titanate membrane 20, the separator for the battery. In the embodiment of FIG. 2a, the electrode 26, e.g., zinc electrode, is positioned in direct contact with the fibrous inorganic membrane 20.

In producing the separator embodiment illustrated in FIGS. 2 and 2a, the organic sheets such as the Teflon paper 22, or 22 and 24, can be pressed tightly against one or both of the opposite surfaces of the inorganic, e.g., potassium titanate membrane 20, thus, in effect, impregnating such surfaces with the organic papers. However, if desired, this procedure can be modified, referring particularly to FIG. 2, by simply placing the sheets 22 and 24 into contact with the opposite surfaces of the potassium titanate membrane 20, and then pressing the electrodes 26 and 28 tightly into contact with the organic, e.g., Teflon papers 22 and 24, in forming a battery assembly.

The organic sheets or papers 22 and 24, e.g., Teflon paper, must be of a porous nature, the porosity of such organic materials being such that electrolyte, i.e., hydroxyl, ions can pass freely through such papers and into the organic membrane 20, whereas the electrode ions such as silver and zinc ions are retained in the electrolyte compartments and, are prevented from passing through such organic papers. In this respect, microporous Teflon sheets as well as microporous sheets of other organic materials such as those noted above are suitable for use in the modification of FIGS. 2 and 2a.

Each of the types of reinforced inorganic, e.g., potassium titanate, separators according to the invention and illustrated in FIGS. 1, 2 and 2a above can be incorporated into a battery assembly as shown in FIG. 3.

Thus, for example, separators of the type indicated at 10 in FIG. 1 can be assembled to form a battery as shown in FIG. 3, employing a plastic case 34 formed of two symmetrical, e.g., Teflon, half portions 36 and 38 which are bolted together as indicated at 40. Compartments 36 and 38 of the case have recesses 42 formed therein to receive zinc and silver electrodes 16 and 18, respectively. This corresponds to the assembly shown in FIG. 1. The zinc electrode 16 is pressed into the electrode compartment 36 against the metal screen 53, and a silver oxide paste or composition forming the silver electrode 18 is pressed into the opposite electrode compartment 38 into contact with the metal screen 55. Teflon spacers 50 and 52 are provided in the peripheral space around the separator 10, to form a leak proof seal. Terminal wires 54 and 56 are connected respectively to the screens 53 and 55, and are brought through the plastic electrode sections at the top of the assembly as shown. The separator 10 is impregnated with an alkaline, e.g., potassium hydroxide, electrolyte, filling the pores of the separator, and small electrolyte reservoirs 58 and 59 are provided in the upper portion of the respective electrode compartments 36 and 38.

The separator-electrode assembly shown in FIG. 2, including inorganic fibrous separator 20, plastic, e.g., Teflon papers 22 and 24, and electrodes 26 and 28, can be assembled in the manner described immediately above to form a battery assembly as shown in FIG. 3.

FIG. 4 shows a modification of the invention illustrated in FIG. 3. Instead of placing the electrodes 16 and 18 in direct contact with the organically bonded fibrous inorganic separator 10, as shown in FIGS. 1 and 3, the electrodes 16 and 18 in FIG. 4 are spaced from such separator, forming captive electrolyte compartments 60 and 62 between such electrodes and separator 10, insuring a full supply of electrolyte filling the pores of the separator 10 at all times.

The reinforced separator principles of the invention are applicable in various types of batteries, particularly high energy density batteries. Thus, for example, the reinforced separators of the invention can be employed as a separator in high energy density silver-zinc, silver-cadmium and nickel-cadmium batteries.

During discharge of the batteries illustrated in FIGS. 1 to 4, as is well known, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of such battery systems, are intended to denote either the respective metals themselves or the corresponding oxides thereof.

The following are examples of practice of the invention:

*Example 1*

A mixture consisting of about 50° Teflon powder or granules, and about 50% potassium titanate fiber is compressed at about 7,500 p.s.i. pressure and about 300° C. and is assembled in a silver-zinc battery substantially as illustrated in FIG. 3 above, employing a potassium hydroxide electrolyte. The battery operated successfully for 29 discharge-charge cycles each of 30 minutes duration at 100° C.

*Example 2*

A battery of the same type as described above is assembled but employing in place of the Teflon-bonded potassium titanate fiber separator, a potassium titanate fiber separator which was compressed also at 7,500 p.s.i. and 300° C., but in the absence of any organic bonding agent. This battery operates effectively for about 10 discharge-charge cycles each of 30 minutes duration and then fails as result of the weakening or disintegration of the potassium titanate separator.

This demonstrates that an inorganic, e.g., potassium titanate, separator combined with or bonded by an organic material of the types described above, e.g., Teflon, substantially increases the strength of the separator, without adversely affecting the function of the separator or its properties, and materially enhances the life of the battery over a substantially increased number of discharge-charge cycles. Moreover, both Teflon and potassium titanate are resistant to chemical attack and have excellent stability at high temperatures on the order of 100° C. and above.

*Example 3*

A battery is assembled similar to that illustrated in FIG. 3 above except that in this case an inorganic fibrous membrane reinforced with a plastic sheet material positioned against the electrodes as illustrated in FIG. 2, is employed.

In this modification a potassium titanate fiber mat is covered on opposite surfaces thereof with a pair of microporous nylon papers, and this assembly subjected to pressure, to press or impregnate the opposite sides of the potassium titanate separator with the nylon sheets or papers.

This assembly is incorporated into a battery case as illustrated in FIG. 3 so that one of the nylon papers 22 is in contact with a silver oxide electrode and the opposite nylon paper, e.g., 24, is in contact with a zinc electrode, the separator being then impregnated with a potassium hydroxide electrolyte.

A battery of the type described above is capable of running for a large number of discharge-charge cycles at 100° C. substantially without loss of efficiency, whereas a battery assembled essentially as described above, but without using the organic, that is, nylon papers failed after several discharge-charge cycles due to disintegration of the potassium titanate separator.

*Example 4*

A battery is assembled as in Example 1 above except employing Kel-F in place of Teflon. Results similar to those of Example 1 are obtained.

*Example 5*

A potassium titanate-Teflon separator is produced substantially according to the procedure of Example 1 above, except that 25% by weight of Teflon powder and 75% by weight of potassium titanate fibers are employed.

The bonded potassium titanate separator so formed is assembled in a battery as illustrated in FIG. 3. Such an assembly ran for about 26 discharge-charge cycles at elevated temperatures of the order of about 100° C. substantially without loss of efficiency.

*Example 6*

A potassium titanate-Teflon separator is produced substantially according to the procedure of Example 1 above, except that 60% by weight of Teflon powder and 40% by weight of potassium titanate fibers are employed.

The bonded potassium titanate separator so formed is assembled in a battery as illustrated in FIG. 3. Such an assembly ran for about 30 discharge-charge cycles at elevated temperatures of the order of about 100° C. substantially without loss of efficiency.

*Example 7*

A potassium titanate-Teflon separator is produced substantially according to the procedure of Example 1 above.

The bonded potassium titanate separator so formed is assembled in a battery as illustrated in FIG. 3, but employing silver and cadmium electrodes. Such an assembly is capable of running for a substantial number of discharge-charge cycles at elevated temperatures of the order of about 100° C. substantially without loss of efficiency. A similar silver-cadmium battery employing a potassium titanate separator but without use of any organic bonding agent fails after a substantially lower number of discharge-charge cycles.

*Example 8*

A separator is produced substantially according to the procedure of Example 1 but employing a mixture of about 50% magnesium aluminosilicate fibers and about 50% by weight of nylon powder or granules.

The separator so produced is assembled in a zinc-silver battery as illustrated in FIG. 3.

This battery is capable of operation at elevated temperatures of the order of about 100° C. for a substantial number of discharge-charge cycles substantially without loss of effective voltage, whereas the same battery employing a separator produced by the same procedure but in the absence of the nylon bonding material, fails after a relatively few charge-discharge cycles of operation.

*Example 9*

A separator is produced substantially according to the procedure of Example 1 but employing a mixture of about 50% silica fibers and about 50% by weight of Dynel.

The separator so produced is assembled in a battery as illustrated in FIG. 3 employing nickel and cadmium electrodes.

This battery is capable of operation at elevated temperatures of the order of about 100° C. for a substantial number of discharge-charge cycles substantially without loss of effective voltage, whereas the same battery employing a separator produced by the same procedure but in the absence of the Dynel bonding material, fails after a relatively few charge-discharge cycles of operation.

From the foregoing it is seen that the invention provides novel battery separators, and particularly provides highly improved inorganic fiber battery separators by supporting or bonding certain inorganic fibrous materials as described above, preferably potassium titanate, with suitable organic, e.g., plastic materials resulting in separators which are chemically resistant, particularly to alkaline electrolytes, and are resistant to oxidation by the electrodes such as silver oxide electrode, have a porosity preventing migration of electrode ions such as zinc and silver ions to opposite electrodes through the separator while permitting such migration of the electrolyte ions, and which in addition have enhanced strength and greater flexibility. Such separators are of particular value for use in high energy density batteries capable of running for a large number of discharge-charge cycles both at ambient temperature and at elevated temperature at or above 100° C.

We are aware of the article entitled "Ionic Conductivity of Zirconium Phosphate," by R. P. Hamlen, Journal of the Electrochemical Society, page 746 (August 1962 issue), which describes at page 748, a fuel cell using a membrane prepared by compressing a mixture of 90% zirconium phosphate and 10% powdered Teflon. However, the article points out that the Teflon binder in this case decreased the electrical conductivity of the membrane substantially, which is undesirable for fuel cell operation, the article noting on page 749 that it is desirable to increase the conductivity of the membrane for this purpose. Further, the zirconium phosphate employed was not a fibrous material but was rather in the form of particles. Such particulate material does not have the porosity and strength required for a satisfactory battery separator, and which is provided by the different fibrous inorganic separator materials according to the invention.

Thus, it was unexpected, on the other hand, that the bonding of the fibrous inorganic battery separator materials potassium titanate, the aluminosilicates, zirconia, silica or alumina, with an organic bonding agent such as Teflon, and especially employing substantial or major amounts of Teflon of the order of 50% by weight or more of the inorganic material, does not adversely affect the porosity characteristics, chemical or corrosion resistance, or stability at temperatures of the order of 100° C., of such fibrous inorganic separator material itself, yet enhances the strength and flexibility of the resulting inorganic Teflon-bonded battery separator.

While we have described particular embodiments of our invention for the purpose of illustration, it is to be understood that the invention is not to be taken as limited except by the scope of the appended claims.

We claim:

1. A battery comprising a pair of electrodes of opposite polarity and a porous separator between said electrodes for retaining electrolyte and permitting transfer of electrolyte ions, but preventing introduction of electrode ions through said separator, said separator comprising a bonded matrix consisting essentially of potassium titanate fibers and about 2% to about 90% by weight of the separator, of tetrafluoroethylene polymer.

2. A battery comprising a pair of electrodes of opposite polarity and a porous separator between said electrodes for retaining electrolyte and permitting transfer of electrolyte ions, but preventing introduction of electrode ions through said separator, said separator comprising a membrane formed of fibrous potassium titanate and a thin sheet of microporous tetrafluoroethylene polymer plastic in contact with a surface of said membrane.

3. A battery comprising zinc and silver electrodes and a porous separator between said electrodes for retaining electrolyte and permitting transfer of electrolyte ions, but preventing introduction of electrode ions through said separator, said separator comprising a bonded matrix consisting essentially of potassium titanate fibers and about 2% to about 90% by weight of the separator, of tetrafluoroethylene polymer, said separator having a porosity ranging from about 8% to about 40%.

4. A battery comprising zinc and silver electrodes and a porous separator between said electrodes for retaining electrolyte and permitting transfer of electrolyte ions, but preventing introduction of electrode ions through said separator, said separator comprising a memberane formed of fibrous potassium titanate and a thin sheet of microporous tetrafluoroethylene polymer plastic in contact with a surface of said membrane, said separator having a porosity ranging from about 8% to about 40%.

5. A battery comprising zinc and silver electrodes and a porous separator between said electrodes for retaining electrolyte and permitting transfer of electrolyte ions, but preventing introduction of electrode ions through said separator, said separator comprising a membrane formed of fibrous potassium titanate and a pair of thin sheets of microporous tetrafluoroethylene polymer plastic, the respective sheets being pressed against opposite surfaces of said membrane.

6. A battery comprising silver and cadmium electrodes and a porous separator between said electrodes for retaining electrolyte and permitting transfer of electrolyte ions, but preventing introduction of electrode ions through said separator, said separator comprising fibrous potassium titanate combined with tetrafluoroethylene polymer, said separator having a porosity ranging from about 8% to about 40%.

7. A battery comprising nickel and cadmium electrodes and a porous separator between said electrodes for retaining electrolyte and permitting transfer of electrolyte ions, but preventing introduction of electrode ions through said separator, said separator comprising fibrous potassium titanate combined with tetrafluoroethylene polymer, said separator having a porosity ranging from about 8% to about 40%.

8. A battery comprising a pair of electrodes of opposite polarity and a porous separator between said electrodes for retaining electrolyte and permitting transfer of electrolyte ions, but preventing introduction of electrode ions through said separator, said separator comprising a membrane formed of fibrous potassium titanate.

9. A battery comprising a pair of electrodes of opposite polarity and a porous separator between said electrodes for retaining electrolyte and permitting transfer of electrolyte ions, but preventing introduction of electrode ions through said separator, said separator comprising fibrous potassium titanate combined with tetrafluoroethylene polymer.

References Cited

UNITED STATES PATENTS

| | | | |
|---|---|---|---|
| 3,014,085 | 12/1961 | Bachman | 136—146 X |
| 1,458,377 | 6/1923 | Anderson | 136—146 |
| 2,422,045 | 6/1947 | Ruben | 136—154 X |
| 2,427,183 | 9/1947 | Berry. | |
| 2,866,769 | 12/1958 | Happoldt. | |
| 3,129,105 | 4/1964 | Berry et al. | 106—55 |
| 3,147,150 | 9/1964 | Mendelsohn et al. | 136—146 X |
| 3,217,083 | 11/1965 | Gore | 252—66 X |

WINSTON A. DOUGLAS, *Primary Examiner.*

D. L. WALTON, *Assistant Examiner.*